United States Patent
Smith et al.

(10) Patent No.: US 9,523,172 B2
(45) Date of Patent: Dec. 20, 2016

(54) PROCESS FOR PRODUCING POLYVINYL ALCOHOL ARTICLES

(75) Inventors: Novis Smith, Philadelphia, PA (US); Charles Roberson, Greensboro, NC (US)

(73) Assignee: Lakeland Industries, Inc., Ronkonkoma, NY (US)

( * ) Notice: Subject to any disclaimer, the term of this patent is extended or adjusted under 35 U.S.C. 154(b) by 0 days.

(21) Appl. No.: 13/317,965

(22) Filed: Nov. 1, 2011

(65) Prior Publication Data

US 2015/0159322 A1    Jun. 11, 2015

Related U.S. Application Data

(63) Continuation-in-part of application No. 13/135,917, filed on Jul. 18, 2011, now Pat. No. 8,293,664.

(51) Int. Cl.
*D06N 3/04* (2006.01)
*D04H 3/009* (2012.01)
(Continued)

(52) U.S. Cl.
CPC ............... *D06N 3/04* (2013.01); *B32B 5/022* (2013.01); *B32B 5/024* (2013.01); *B32B 5/26* (2013.01); *D04H 1/4309* (2013.01); *D04H 3/009* (2013.01); *D04H 3/11* (2013.01); *D06B 1/00* (2013.01); *D06C 7/00* (2013.01); *D06M 11/05* (2013.01); *D06M 11/84* (2013.01); *D06N 3/0011* (2013.01); *B32B 2255/02* (2013.01); *B32B 2262/023* (2013.01); *B32B 2262/0253* (2013.01); *B32B 2307/3065* (2013.01); *B32B 2307/402* (2013.01); *B32B 2307/4026* (2013.01); *B32B 2307/73* (2013.01); *D10B 2321/06* (2013.01); *D10B 2401/024* (2013.01); *D10B 2401/10* (2013.01); *D10B 2501/00* (2013.01); *Y10T 442/2033* (2015.04); *Y10T 442/2525* (2015.04); *Y10T 442/60* (2015.04); *Y10T 442/696* (2015.04)

(58) Field of Classification Search
USPC ..... 442/85–86, 172–173, 394, 396, 136, 399
See application file for complete search history.

(56) References Cited

U.S. PATENT DOCUMENTS

| | | |
|---|---|---|
| 3,322,593 A | 5/1967 | Conti |
| 3,413,229 A | 11/1968 | Bianco et al. |

(Continued)

FOREIGN PATENT DOCUMENTS

| | | |
|---|---|---|
| CN | 1352710 | 6/2002 |
| GB | 1187690 | 4/1970 |

(Continued)

OTHER PUBLICATIONS

USPTO; Non-Final Office Action dated Jan. 18, 2012 in U.S. Appl. No. 13/135,917.

(Continued)

*Primary Examiner* — Lynda Salvatore
(74) *Attorney, Agent, or Firm* — Snell & Wilmer L.L.P.

(57) ABSTRACT

The present invention relates to novel polyvinyl alcohol non-woven films and fabrics which have been modified so as to have a breathable coalesced lower porosity surface polyvinyl alcohol layer attached to a fibrous polyvinyl alcohol layer by a transition layer. The fabrics are useful as clothing or wraps for inert articles.

18 Claims, 2 Drawing Sheets

(51) Int. Cl.

| | |
|---|---|
| *D06B 1/00* | (2006.01) |
| *D06C 7/00* | (2006.01) |
| *D06N 3/00* | (2006.01) |
| *D04H 1/4309* | (2012.01) |
| *D04H 3/11* | (2012.01) |
| *D06M 11/05* | (2006.01) |
| *D06M 11/84* | (2006.01) |
| *B32B 5/02* | (2006.01) |
| *B32B 5/26* | (2006.01) |

(56) References Cited

U.S. PATENT DOCUMENTS

| | | |
|---|---|---|
| 3,856,598 A | 12/1974 | Gregorian et al. |
| 3,859,125 A | 1/1975 | Miller et al. |
| 3,870,542 A | 3/1975 | Ida et al. |
| 3,874,964 A | 4/1975 | Cogliano et al. |
| 4,147,844 A | 4/1979 | Babinsky et al. |
| 4,272,851 A | 6/1981 | Goldstein |
| 4,324,827 A * | 4/1982 | Obayashi ............. D06M 17/04 427/375 |
| 4,343,133 A | 8/1982 | Daniels et al. |
| 4,409,761 A | 10/1983 | Bechtel |
| 4,415,617 A | 11/1983 | D'Elia |
| 4,639,390 A | 1/1987 | Shoji |
| 4,713,068 A | 12/1987 | Wang et al. |
| 4,726,986 A | 2/1988 | Cannady et al. |
| 4,731,266 A | 3/1988 | Bonnebat et al. |
| 4,772,510 A | 9/1988 | McClure |
| 4,833,010 A | 5/1989 | Langley |
| 4,855,178 A | 8/1989 | Langley |
| 4,865,903 A | 9/1989 | Adiletta |
| 4,879,165 A | 11/1989 | Smith |
| 4,920,575 A | 5/1990 | Bartasis et al. |
| 4,924,525 A | 5/1990 | Bartasis |
| 4,970,105 A | 11/1990 | Smith |
| 4,981,738 A | 1/1991 | Farnworth et al. |
| 5,002,820 A | 3/1991 | Bolton et al. |
| 5,035,941 A | 7/1991 | Blackburn |
| 5,037,700 A | 8/1991 | Davis |
| 5,061,748 A | 10/1991 | Bolton et al. |
| 5,082,721 A | 1/1992 | Smith, Jr. et al. |
| 5,098,770 A | 3/1992 | Paire |
| 5,124,208 A | 6/1992 | Bolton et al. |
| 5,151,314 A * | 9/1992 | Brown ......................... 428/198 |
| 5,162,148 A | 11/1992 | Boye et al. |
| 5,166,007 A | 11/1992 | Smith et al. |
| 5,236,769 A | 8/1993 | Paire |
| 5,250,350 A | 10/1993 | Tung |
| 5,266,167 A | 11/1993 | Hess |
| 5,491,022 A | 2/1996 | Smith |
| 5,492,108 A | 2/1996 | Smith et al. |
| 5,494,720 A | 2/1996 | Smith et al. |
| 5,496,640 A | 3/1996 | Bolton et al. |
| 5,554,667 A | 9/1996 | Smith et al. |
| 5,667,885 A | 9/1997 | Nguyen et al. |
| 5,688,577 A | 11/1997 | Smith et al. |
| 5,692,935 A | 12/1997 | Smith |
| 5,763,062 A | 6/1998 | Smith et al. |
| 5,869,193 A | 2/1999 | Langley |
| 6,045,900 A | 4/2000 | Haffner et al. |
| 6,302,993 B1 | 10/2001 | Smith et al. |
| 6,364,980 B1 | 4/2002 | Smith et al. |
| 6,638,605 B1 | 10/2003 | Ankuda et al. |
| 6,671,031 B1 | 12/2003 | Nishimura |
| 6,803,034 B2 | 10/2004 | Duval et al. |
| 6,808,791 B2 | 10/2004 | Curro et al. |
| 7,093,307 B2 | 8/2006 | Smith |
| 7,358,295 B2 | 4/2008 | Miller et al. |
| 7,718,555 B1 | 5/2010 | Smith et al. |
| 7,937,772 B1 | 5/2011 | Smith et al. |
| 8,293,664 B1 | 10/2012 | Smith et al. |
| 2001/0008695 A1 | 7/2001 | Bolton et al. |
| 2002/0028876 A1 | 3/2002 | Jenkines et al. |
| 2002/0091074 A1 | 7/2002 | Wooley et al. |
| 2002/0115581 A1 | 8/2002 | DuVal et al. |
| 2002/0155302 A1 | 10/2002 | Smith et al. |
| 2002/0164465 A1 | 11/2002 | Curro et al. |
| 2003/0003308 A1 | 1/2003 | Kashiba et al. |
| 2003/0044579 A1 | 3/2003 | Bolton |
| 2003/0082445 A1 | 5/2003 | Smith et al. |
| 2003/0082972 A1 | 5/2003 | Monfalcone et al. |
| 2004/0096666 A1 | 5/2004 | Knox et al. |
| 2004/0121678 A1 | 6/2004 | Baldwin et al. |
| 2006/0046022 A1 | 3/2006 | Bader et al. |
| 2007/0172614 A1 | 7/2007 | Lee |
| 2008/0038975 A1 | 2/2008 | Weiss |
| 2009/0061131 A1 | 3/2009 | Monfalcone et al. |
| 2009/0294294 A1 | 12/2009 | Feng et al. |
| 2009/0325447 A1 | 12/2009 | Austin |
| 2010/0055472 A1 | 3/2010 | Bravet et al. |

FOREIGN PATENT DOCUMENTS

| | | |
|---|---|---|
| WO | 9416585 | 8/1994 |
| WO | 9425189 | 11/1994 |
| WO | 0058539 | 10/2000 |
| WO | 03071012 | 8/2003 |
| WO | 2004052522 | 6/2004 |
| WO | 2013012854 | 1/2013 |

OTHER PUBLICATIONS

USPTO; Final Office Action dated Apr. 6, 2012 in U.S. Appl. No. 13/135,917.

USPTO; Notice of Allowance dated Jun. 14, 2012 in U.S. Appl. No. 13/135,917.

PCT; International Search Report and Written Opinion dated Dec. 7, 2012 in Application No. PCT/US12/047047.

EPO; European Search Search Report dated Jul. 20, 2015 in Application No. 12814529.9.

USPTO; Non Final Office Action dated Dec. 18, 2015 in U.S. Appl. No. 13/533,392.

USPTO; Non Final Office Action dated Jun. 21, 2016 in U.S. Appl. No. 13/533,392.

* cited by examiner

PROCESS FOR PRODUCING POLYVINYL ALCOHOL ARTICLES

CROSS-REFERENCE TO RELATED APPLICATIONS

This application is a continuation-in-part of U.S. application Ser. No. 13/135,917, filed Jul. 18, 2011, now U.S. Pat. No. 8,293,664 issued Oct. 23, 2012, which application is herein incorporated by reference in its entirety.

FIELD OF THE INVENTION

The present invention relates to articles and garments with a modified polyvinyl alcohol film fabric having the utility of a material sold by DuPont de Nemours and Company under the trademark TYVEK® which is a non-woven spunbonded polyolefin. More particularly there is provided a modified polyvinyl alcohol fibrous film having the combination of a lower porosity film like layer of coalesced or fused fibers with a fibrous layer attached core layer.

BACKGROUND OF THE INVENTION

The prior art has recognizes uses for polyvinyl alcohol compositions in the manufacture of water soluble useful articles. For example, U.S. Pat. No. 3,413,229 which is incorporated herein by reference, teaches the production of water soluble bags or pouches for which packets or the like are produced containing such materials as detergents, bleaches, insecticides, medicinals, chemicals, dyes, pigments, industrial additives and other materials. It is taught that the contents of the packets are dispersed merely by dropping the packets into water whereupon the bags dissolve and release their contents into aqueous dispersions. However, the referenced patent teaches the production of such films which are both hot and cold water soluble.

U.S. Pat. No. 3,859,125, which is incorporated herein by reference, teaches the production of layered articles which include coatings of polyvinyl alcohol. The subject reference teaches coating polyvinyl alcohol on a paper membrane whereby it is taught that the coated paper is soluble in either high or low temperature water. Similarly, U.S. Pat. No. 4,343,133 teaches the coating of polyvinyl alcohol onto a non-woven fiber sheet impregnated with latices of polyvinyl acetate in the manufacture of a pre-moistened towelette which can be disposed of by flushing in plain water without danger of clogging a plumbing system.

Both U.K. Patent No. 1,187,690 and Japanese Patent No. 72041741, which are incorporated herein by reference, teach the production of stand alone polyvinyl alcohol films which are water soluble. The U.K. patent teaches the production of hospital bags and packaging material for such products as detergents and agricultural chemicals while the Japanese patent teaches the use of polyvinyl alcohol films to make laundry bags which dissolve releasing soiled garments contained therein. However, neither reference teaches the unique films of the present invention which can be configured into useful garments and like materials.

U.S. Pat. No. 4,272,851 to Goldstein discloses a protective garment of non-woven, spun bonded polyolefin manufactured by DuPont de Nemours & Co. which is coated on one side by a polyethylene film. The film provides tear resistance, and the film prevents chemical penetration. One of the problems is the cost of manufacture and the problem of scorching during manufacture of the film.

None of the prior patents relate to modifying a polyvinyl alcohol breathable non-woven fabric to form a top surface of infinitely controllable porosity and susceptible to thermal transfer in combination with a polyvinyl alcohol fiber layer.

SUMMARY OF THE INVENTION

According to one embodiment, the present invention provides a modified a non-woven, fabric or laminate of polyvinyl alcohol (PVOH) to use alone or in a laminate to provide a film or fabric which can be formed into useful breathable films, non-woven fabrics and articles.

More particularly, there is provided a polyvinyl alcohol film wherein at least one surface has been modified to provide a fused substantially lower porous layer that is susceptible to thermal transfer and is attached to a flexible soft fibrous polyvinyl alcohol layer by a transition layer which can be varied as to the amount of pores during manufacture.

The variable or low porosity layer is attached to the fibrous polyvinyl alcohol layer by a transition layer. The transition layer is the combination of coalesced film or fused layer which is formed during processing and the fibrous layer which is composed of the original nonwoven fabric which remains during formation.

Advantageously, the top and bottom surfaces of the polyvinyl alcohol film have lower porosity and breathability.

The variably porous layers can be provided during manufacture with a water repellant layer or an anti-microbial coating.

"Variable" means that the amount of pores produced by controlling the conditions of the polyvinyl alcohol at the time of manufacture of the fabric.

Preferably, the amount of pores formed in the surface layer is from the surface treatment of the nonwoven fabric by steam impinging the surface or occurring by water held by the film or fabric combined with momentary pressure and direct heat application.

The surface layer or layers varies in porosity depending upon the amount of water held by the initial fiber or fabric or the humidity at the time of manufacture so as to be at least slightly porous and breathable.

In accordance with another embodiment of the invention, the modified polyvinyl alcohol is manufactured into films, garments, wraps, fabrics, including pillow covers, linens, etc. where TYVEK® has been found to be useful.

It is therefore a general object of the invention to provide a polyvinyl alcohol film with at least one surface with a breathable selected porous surface bonded to a fibrous polyvinyl alcohol layer.

It is another object of the invention to provide a laminate with a polyvinyl alcohol film having a coalesced surface layer that its porosity can be regulated by preconditioning the amount of water held by the polyvinyl alcohol prior to formation of the laminate.

It is a further object of the invention to provide wraps, garments and other useful articles with a film having similar characteristics of TYVEK®.

It is a still further object of the invention to provide protective garments and medical garments which are readily disposable after use.

It is yet another object of the invention to provide polyvinyl alcohol woven or non-woven films or fabrics having a modified surface.

These and other objects and advantages will become more apparent for the Description of Preferred Embodiment and the following drawings.

DESCRIPTION OF THE PREFERRED EMBODIMENTS

According to the present invention there is provided a film, fabric, garment or article comprising a breathable polyvinyl alcohol film in which at least one surface layer has been modified so as to possess a tightly controlled porosity.

Figure 1A:
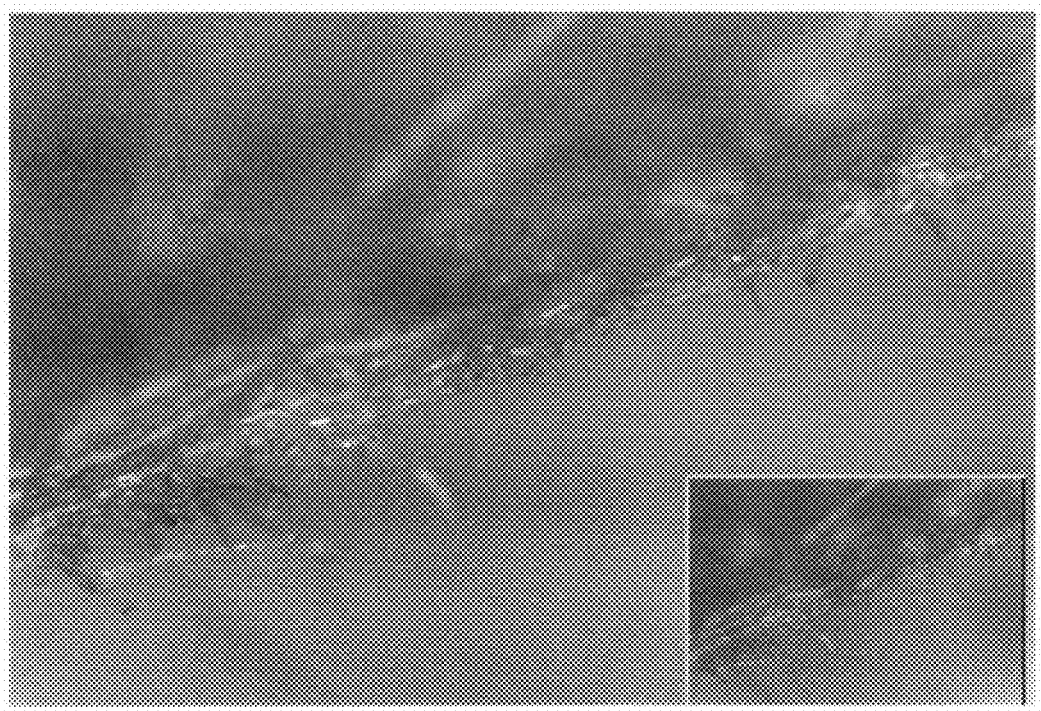
FIG. 1A is a microscopic photograph of a cross-sectional view of the end of the film or fabric of the invention.
Figure 1B:
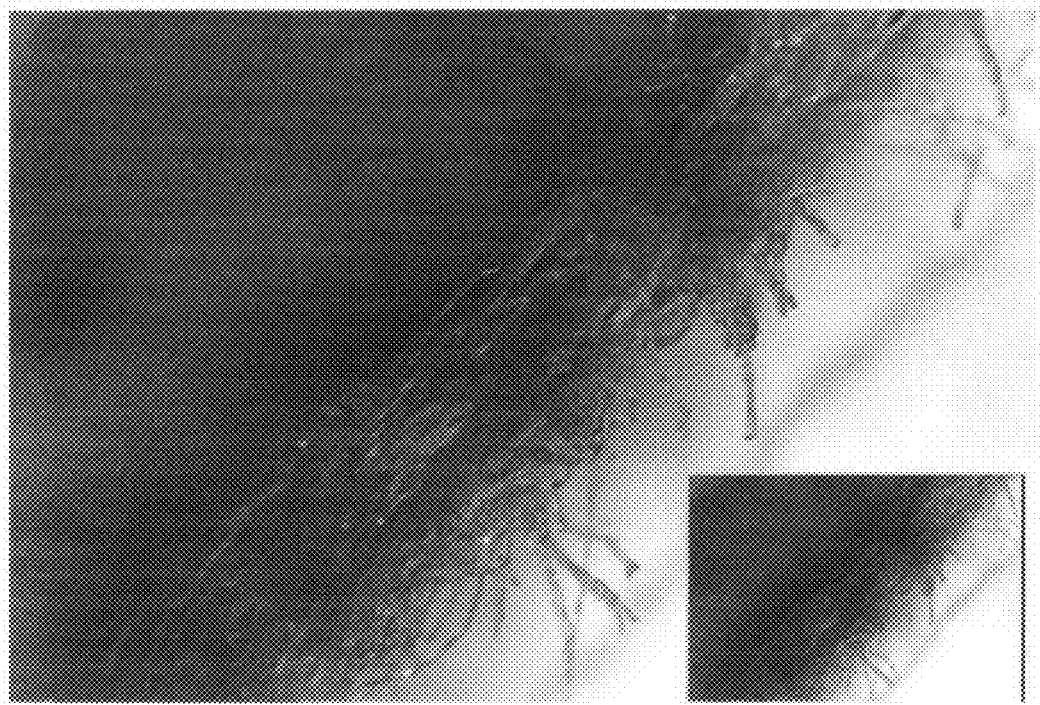
FIG. 1B is a microscopic photograph of a cross-sectional view of the side of the film or fabric of FIG. 1A.

FIGS. 1A and 1B are microscopic photograph of the modified polyvinyl alcohol film (10) of the invention.

Figure 2:
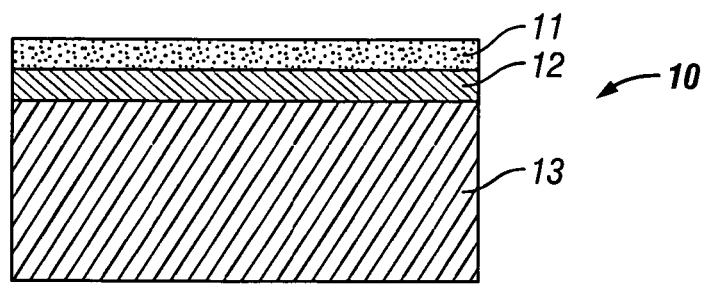
FIG. 2 is a schematic view of the fabric of FIG. 1.

FIG. 2 is a schematic illustration of the film (10) of FIG. 1A. The film (10) comprises a surface layer (11) in which the polyvinyl alcohol fiber has been modified so as to regulate control and reduce its porosity. The low porous porous surface (11) is attached to a fibrous portion (13) through a transition layer (12) which is a mixture of a coalesced polyvinyl alcohol film or fibrous polyvinyl alcohol which has been formed during the modification of the surface layer (11).

Figure 3:
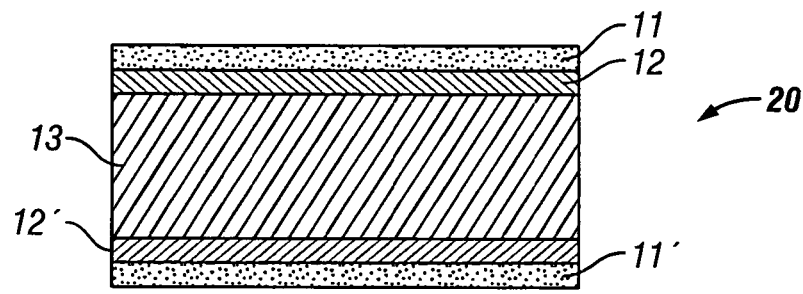
FIG. 3 is a cross sectional view of the fabric of the invention having two modified surfaces.

As shown in FIG. 3, there is provided a film (20) wherein the upper surface comprises a coalesced lower porosity polyvinyl alcohol layer (11) and the bottom layer ($11^1$) also comprises a coalesced low porosity polyvinyl alcohol layer of the same porosity or different porosity ($12^1$) that is adhered to the fibrous polyvinyl alcohol layer (13) through a transition layer ($12^1$).

Figure 4:
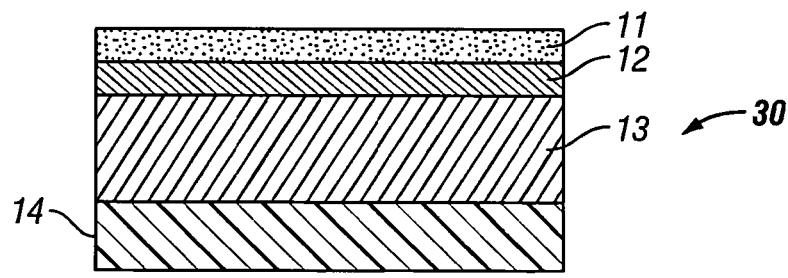
FIG. 4 is a cross-sectional view of the fabric of FIG. 2 with a bottom thermoplastic layer.

As shown in FIG. 4, the film or fabric (30) comprises a top surface (11) of a coalesced polyvinyl alcohol which is bound to a fibrous layer (13) of polyvinyl alcohol by means of a transition layer (12). On the bottom a thermoplastic layer (14) is adhered to the fibrous polyvinyl alcohol layer by compression or use of an adhesive or otherwise.

Figure 5:
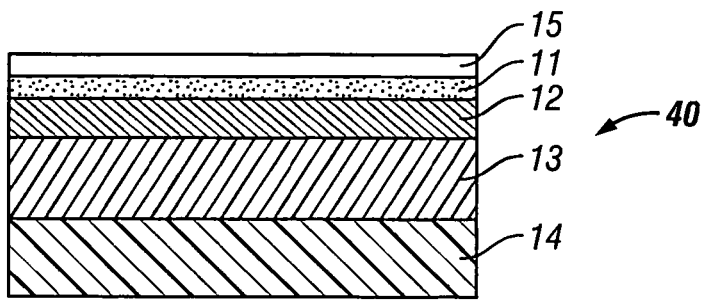
FIG. 5 is a cross-sectional view of the fabric of FIG. 4 with a water repellent coating on the surface layer.

As shown in FIG. 5, a film or fabric (40) similar to the non-woven film or fabric (30) in FIG. 4 is provided with a topically applied water repellant coating (15). The film or fabric (40) has similar properties to TYVEK® and also some additional advantages.

The non-woven films or fabrics of the invention have a surface layer which is more susceptible to thermal transfer than the interior fiber layer (13). In this way they can be bonded into a near film-like exterior while leaving the inner fibers unbonded. In so doing, one would effectively alter the monolithic fiber structure of a spunlaced PVOH fabric into a fabric with three distinct layers. The two outside layers would be highly compacted and bonded to improve fabric strength and abrasion resistance, while the inner core of the fabric would be highly compacted but would not be bonded together and resulting in a soft flexible fabric.

The film or fabric of the invention can be only polyvinyl alcohol with or without acetyl groups and cross-linked or uncross-linked.

The film or fabric can comprise a laminate formed with polyvinyl alcohol and another thermoplastic, preferably, a polyolefin, i.e. polyethylene to provide added tear strength.

Precursor polymer or sheet materials useful in practicing the present method comprise polyvinyl alcohol with or without acetyl groups, cross-liked or uncross-linked. The garments of the inventional are comprised of a polyvinyl alcohol homopolymer that has been highly oriented by post drawing or heat annealing. Ideal for use in the present invention would be a highly crystallized, at least approximately 98% saponified or hydrolyzed polyvinyl acetate. Commercially, polyvinyl alcohol which is sold under the trademark Vinex 1003™ and 1002™ by Air Products could be used herein. Useful PVOH fibers are typically 0.5 denier to 5.0 denier and are preferably from 1.0-2.0 denier and most preferably sized at 1.2-1.5 denier. A commercially available product for use in the present invention is either type T-B (VEE 1290) or type T-5 (VPB 101) which are each available from Kuralon as its PVA fiber. This material is sold in 44 mm lengths. The T-B product is sized at 1.2 denier while the T-5 product is sold in 38 mm staple lengths of 1.5 denier.

The precursor fabric useful in practicing the present invention can be constructed by any well known technique for making woven, non-woven, knitted or otherwise formed fabric. Such non-woven techniques useful in practicing the present invention include spun bonding, melt blowing or wet laying, hydro entangling with cold water and/or thermally bonding with 30-70% of the surface melted to form essentially a non porous surface. When products are configured of sheets of suitable thermoplastic material, the sheets are approximately 3 to 20 mils in thickness and more preferably 8 to 12 mils in thickness and most preferably approximately 8 mils in thickness. Suitable non-woven fabric or sheets are approximately from 15 $g/yd^2$ to 200 $g/yd^2$ in weight and more preferably from 20 $g/yd^2$ to 70 $g/yd^2$ and most preferably from 25 $g/yd^2$ to 80 $g/yd^2$.

As noted previously, polymer or sheet material useful in practicing the present invention is comprised of polyvinyl alcohol with or without acetyl groups, cross-linked or uncross-linked. It is proposed that the polyvinyl alcohol be substantially fully hydrolyzed, that is, having 98% or greater hydrolyzed acetyl groups.

For the sake of adequate mechanical strength, in some cases the polyvinyl alcohol-based non-woven fabric or sheet material should have a degree of polymerization of at least 700 and no greater than approximately 1500. Ideally, such materials should have a degree of polymerization of approximately 900 and be substantially crystallized.

To enhance the manufacture of suitable polyvinyl alcohol resin-based materials, suitable quantities of a plasticizer may be necessary. It is contemplated that up to 15% (wt.) of a suitable plasticizer such as glycerine or polyethylene glycol may be employed to assist in providing a smooth melt extrusion from the polyvinyl alcohol-based pellets.

It was found that the manufactured fabric for use as disposable medical garments displayed nearly identical physical properties similar to fabric manufactured from polyester and polypropylene. However, the fabric manufactured was unaffected by cool or warm water (23°-37° C.) but when exposed to hot water (80°-90° C.), immediately dissolved.

The incorporation of a water repellent to the surface of the modified polyvinyl alcohol film or fabric is quite a useful adjunct to minimize surface attack by liquid moisture at a temperature lower than that at which solubility occurs. It has been found that even with polyvinyl alcohol films and fabrics which become water soluble only at elevated temperatures, when exposed to water, the surface of such material tends to take on a slick "feel" and the use of water repellents tends to minimize this effect. Suitable repellents include fluorocarbons offered by the 3M Co. sold under its trademarks FC 824 and 808. Oleic acid and fatty acids are also useful repellants. These materials are useful in the range of between 0.1 to 2.0% (wt.) based upon the weight of the polyvinyl alcohol polymer.

Antimicrobial agents can be added to the surface particularly for medical applications such as gowns, drapes, etc. Antimicrobials include GERM PATROL® sold by Germ Patrol, LLC, silanes, silver or copper antimicrobials, and the like.

The surface modified polyvinyl alcohol can be produced as disclosed in U.S. patent application Ser. No. 13/135,917 filed Jul. 18, 2011.

The surface can also be modified by utilizing the water retention held by the precursor film or fabric. In this regard the film or fabric can be preconditioned by subjecting the film or fabric to a fixed humidity and temperature for time sufficient for equilibrium between fiber and the atmosphere to occur, 24 to 96 hours, 72 hours beginning preferred and then utilizing heated rollers and pressure rollers to create the steam to melt and compact the surface and form a layer of reduced porosity while leaving the adjoining fibers in tact. The films or fabrics of the present invention are useful in making medical clothing, gowns, drapes, etc. The films or fabrics can be formed into envelopes, building wraps for inert articles.

A variety of modifications to the embodiment described will be apparent to those skilled in the art from the disclosure provided herein. Thus, the present invention can be embodied in other specific forms without departing from the spirit or essential attributes thereof and accordingly, reference should be made to the appended claims, rather than to the foregoing specification, as indicating the scope of the invention.

What is claimed is:

1. A non-woven breathable polyvinyl alcohol article comprising
   three polyvinyl alcohol layers each formed from a common fibrous polyvinyl alcohol material, the article comprising:
      a first layer consisting of the fibrous polyvinyl alcohol material as coalesced to have a reduced porosity relative to the fibrous polyvinyl alcohol material, and that is more susceptible to thermal transfer than the fibrous polyvinyl alcohol material;
      a second layer consisting of the fibrous polyvinyl alcohol material in an unmodified state and having a higher porosity than the first layer; and
      a transition layer interposed between the second layer of fibrous polyvinyl alcohol and the first layer and formed during modification of the fibrous polyvinyl alcohol to make the first layer, wherein the transition layer comprises a mixture of the fibrous polyvinyl alcohol and coalesced polyvinyl alcohol;
   wherein the article comprises polyvinyl alcohol from the fibrous polyvinyl alcohol material extending throughout the first layer and transition layer.

2. The article of claim 1 comprising a further polyvinyl alcohol surface layer formed from a modified portion of the second layer of the fibrous polyvinyl alcohol opposite the first layer, wherein the further surface layer is coalesced and has a reduced porosity relative to the second layer of the fibrous polyvinyl alcohol.

3. The article of claim 1 wherein the first layer is formed with steam.

4. The article of claim 1 further comprising a thermoplastic polymer layer attached to the film along the second fibrous polyvinyl alcohol layer, wherein the thermoplastic polymer layer is formed from a material different from that of the fibrous polyvinyl alcohol.

5. The article of claim 4 wherein the thermoplastic polymer layer is a polyolefin.

6. The article of claim 1 having a degree of polymerization of 700 to 1500.

7. The article of claim 1 wherein the film comprises a water repelling composition disposed on the first surface layer.

8. The article of claim 1 wherein the film comprises an antimicrobial composition disposed on the first surface layer.

9. The article of claim 1 wherein the polyvinyl alcohol is cross-linked.

10. The article of claim 1 wherein the first surface layer is substantially non porous.

11. The article of claim 1 wherein the polyvinyl alcohol has acetyl groups.

12. Clothing comprising the article of claim 1.

13. The clothing of claim 12 wherein the article contains a plasticizer.

14. The clothing of claim 12 including an antimicrobial coating.

15. The clothing of claim 14 which comprises medical clothing.

16. The clothing of claim 12 wherein the polyvinyl alcohol is spun laced.

17. The article of claim 1 which is film.

18. The article of claim 1 which is a fabric.

* * * * *